Patented Aug. 13, 1935

2,011,454

UNITED STATES PATENT OFFICE 2,011,454

PROCESS OF SYNTHETICALLY PRODUCING EPHEDRIN HOMOLOGUE AND ITS SALTS

Chogi Nagai, deceased, late of Shibuya-Machi, Toyotama-Gun, Tokyo, Japan, by Alexander Nagai, heir, Berlin, Germany No Drawing. Application March 6, 1930, Serial No. 433,817. In Japan August 6, 1929

2 Claims. (Cl. 260—128.5)

This invention relates to the process of synthetically producing a new substance chosen from the group consisting of $C_9H_{11}NO_3$=1-(m,p-methylene-dioxyphenyl)-2-amino-ethan-1-ol and $C_{10}H_{13}NO_3$ =1-(m,p-methylene-dioxy-phenyl)-2-amino-propan-1-ol, resembling in its chemical and biological action to ephedrin, by reducing, in the presence of or absence of formaldehyde, nitroalcohol obtained by the condensation of piperonal with nitroparaffine of 1 carbon and 2 carbon nucleus in the presence of alkali, and the object of the invention is to produce a substitute for natural or synthetic ephedrin economically.

The following data are given by way of examples according to this invention.

EXAMPLE I

*1-(m,p-methylene-dioxyphenyl)-2-amino-ethan-1-ol*

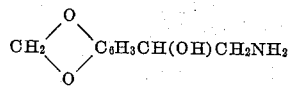

A condensation product formed by agitating 15 grams of piperonal, 6.5 grams of nitromethane with 60 c. c. of 20% potassium bicarbonate solution for 4 days is dissolved in ether and is shaken with sodium bisulphite solution and is then shaken with alkali carbonate solution. The ether is distilled away from the ethereal solution which leaves methylene-dioxy-phenyl-nitroethanol. This compound is reduced by means of alcohol, 25% sulphuric acid, and iron filings, and then is crystallized out of dilute alcohol or absolute alcohol as sulphate or chloride.

After the addition of sodium hydroxide to this chloride solution, the solution is shaken with ether, which is then distilled away from the etheric solution, leaving a base shown in the title of this example having a melting point of 74° C.

EXAMPLE II

*1-(m,p-methylene-dioxy-phenyl)-2-amino-propan-1-ol*

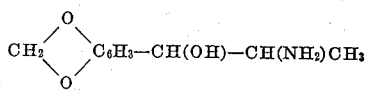

A mixture of 15 grams of piperonal, 7.5 grams of nitroethane and 20 c. c. of saturated solution of potassium bicarbonate is agitated for a week and is then treated as is the methylene-dioxyphenyl-amino-ethanol described in the preceding example, and is refined as sulphate or chloride. A base shown in the title of this example is obtained from this salt by being treated likewise in the Example I.

EXAMPLE III

*1-(m,p-methylene-dioxyphenyl)-2-methyl-amino-propan-1-ol*

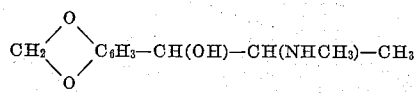

To the condensation product of piperonal and nitroethane shown in the second example, formaldehyde of equal quantity is added and the mixture is reduced by excess of zinc powder and 30% acetic acid. Then the product is diluted by excess of water, into which hydrogen sulphide is blown in to eliminate zinc and from which a small quantity of neutral substances and acetic acid is passed into ether. When the two layers are separated from each other, and when a suitable quantity of hydrochloric acid is added to the aqueous solution, which is then evaporated under reduced pressure, a syrup product is obtained, from which, by treating with alcohol and ether, a white crystal chloric salt of methylene-dioxyphenyl-methyl-amino-propanol is obtained.

The U. S. Patent No. 1,356,877 relates to the process of producing methyl-mydriatin or artificial ephedrin by reducing phenylnitropropanol obtained from benzaldehyde and nitroethane by the action of a solution of weak alkaline organic or inorganic substance such as alkali carbonates, bicarbonates, phosphates or pyridin etc., in the presence of formaldehyde solution, with acetic acid and zinc dust.

This invention employs the above mentioned patent, as this invention is an improvement of the process of said patent, and is a process of producing a new substance chosen from the group consisting of $C_9H_{11}NO_3$=1-(m,p-methylene-dioxyphenyl)-2-amino-ethan-1-ol and $C_{10}H_{13}NO_3$= 1-(m,p-methylene-dioxphenyl)-2-amino-propan-1-ol and its salts in which piperonal instead of benzaldehyde and nitro-methane in addition to nitroethane are used.

What is claimed is:

1. The method of synthetically producing a new substance having the formula

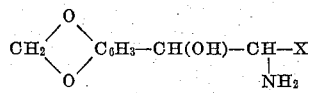

where X is H or CH₃, resembling ephedrin, in its chemical and biological action, by reducing the nitro alcohol obtained by the condensation of piperonal with a nitroparaffine chosen from the group consisting of nitromethane and nitroethane in equimolecular proportions in the presence of alkali carbonate.

2. The method of synthetically producing a new substance having the formula

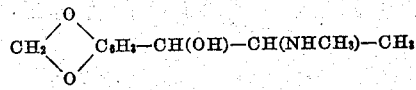

and resembling ephedrin in its chemical and biological action, by reducing with formaldehyde, the nitroalcohol obtained by the condensation of piperonal with a nitroparaffine chosen from the group consisting of nitromethane and nitroethane in equi-molecular proportions in the presence of alkali carbonate.

ALEXANDER NAGAI,
*Heir to the Late Chogi Nagai.*